US009251638B2

(12) United States Patent
Liu et al.

(10) Patent No.: US 9,251,638 B2
(45) Date of Patent: Feb. 2, 2016

(54) BRACKET SUPPORTING APPARATUS

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chao Liu, Wuhan (CN); Zhi-Ping Wu, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 343 days.

(21) Appl. No.: 13/973,693

(22) Filed: Aug. 22, 2013

(65) Prior Publication Data

US 2014/0183308 A1 Jul. 3, 2014

(30) Foreign Application Priority Data

Dec. 28, 2012 (CN) .......................... 2012 1 0582127

(51) Int. Cl.
*F16M 11/00* (2006.01)
*G07F 9/10* (2006.01)

(52) U.S. Cl.
CPC ........................................ *G07F 9/10* (2013.01)

(58) Field of Classification Search
CPC combination set(s) only.
See application file for complete search history.

(56) References Cited

U.S. PATENT DOCUMENTS 4,173,377 A * 11/1979 Heslop .................... A47J 31/40 221/281
4,558,839 A * 12/1985 Kaplan .................. F16M 13/02 248/221.12
5,108,166 A * 4/1992 Klix ........................ E05B 73/00 312/329
6,371,581 B1 * 4/2002 Ring ......................... G07F 9/10 312/138.1
7,861,469 B2 * 1/2011 Heady ..................... E02D 37/00 248/201
7,988,109 B2 * 8/2011 Chen ....................... G06F 1/187 248/201
2008/0185259 A1 * 8/2008 Deaville ............. G07D 11/0003 194/204
2010/0123059 A1 * 5/2010 Saez ...................... F16M 11/04 248/201
2012/0168578 A1 * 7/2012 Peng ...................... H05K 7/142 248/201
2015/0247326 A1 * 9/2015 Haddock ............. E04F 13/0842 52/705

* cited by examiner

*Primary Examiner* — Monica Millner

(74) *Attorney, Agent, or Firm* — Novak Druce Connolly Bove + Quigg LLP

(57) ABSTRACT

A bracket supporting apparatus includes a side plate, two fixing brackets, a first mounting bracket defining a first through hole, and a second mounting bracket defining a second through hole. Each of the two fixing brackets includes a connection portion defining a fixing hole. Two supporting portions extend from two sides of the connection portion. A mounting portion extends from one side of each of the two supporting portions. The two supporting portions of each of the two fixing brackets are substantially parallel to the first mounting bracket and the second mounting bracket. The mounting portions are fixed to the side plate. A first fastener passes through each of the first through holes, the second through holes, and the fixing holes to fix the first mounting bracket and the second mounting bracket to each of the two fixing brackets.

19 Claims, 5 Drawing Sheets

BRACKET SUPPORTING APPARATUS

BACKGROUND

1. Technical Field

The present disclosure relates to a bracket supporting apparatus in vending machines.

2. Description of Related Art

Vending machines have product channels for accommodating product for sale. The product channels are fixed to a base plate by rivets or screws in a typical vending machine. When the product channels are filled with goods, the base plate may become distorted and the vending machine may be destroyed.

Therefore, there is a need for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
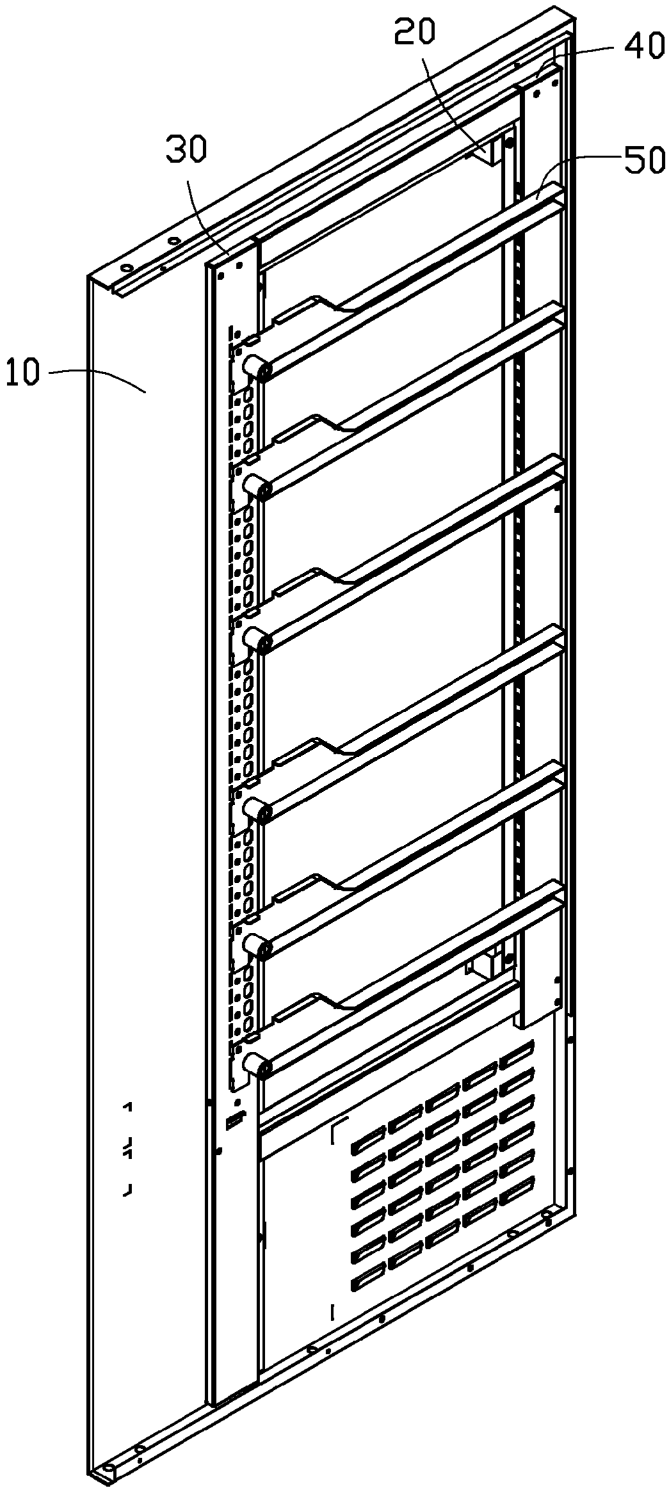
FIG. 1 is an isometric view of an embodiment of a bracket supporting apparatus; the bracket supporting apparatus includes a side plate, a plurality of fixing brackets, a first mounting bracket, a second mounting bracket, and a plurality of slides.

FIG. 1 shows a bracket supporting apparatus of the embodiment. The bracket supporting apparatus includes a side plate 10, a plurality of fixing brackets 20, a first mounting bracket 30, a second mounting bracket 40, and a plurality of slides 50. The first mounting bracket 30 and the second mounting bracket 40 are mounted on the side plate 10 and are parallel to each other. The plurality of slides 50 are parallel mounted on the side plate 10. The first mounting bracket 30 and the second mounting bracket 40 are substantially perpendicular to the plurality of slides 50 on the side plate 10.

Figure 2:
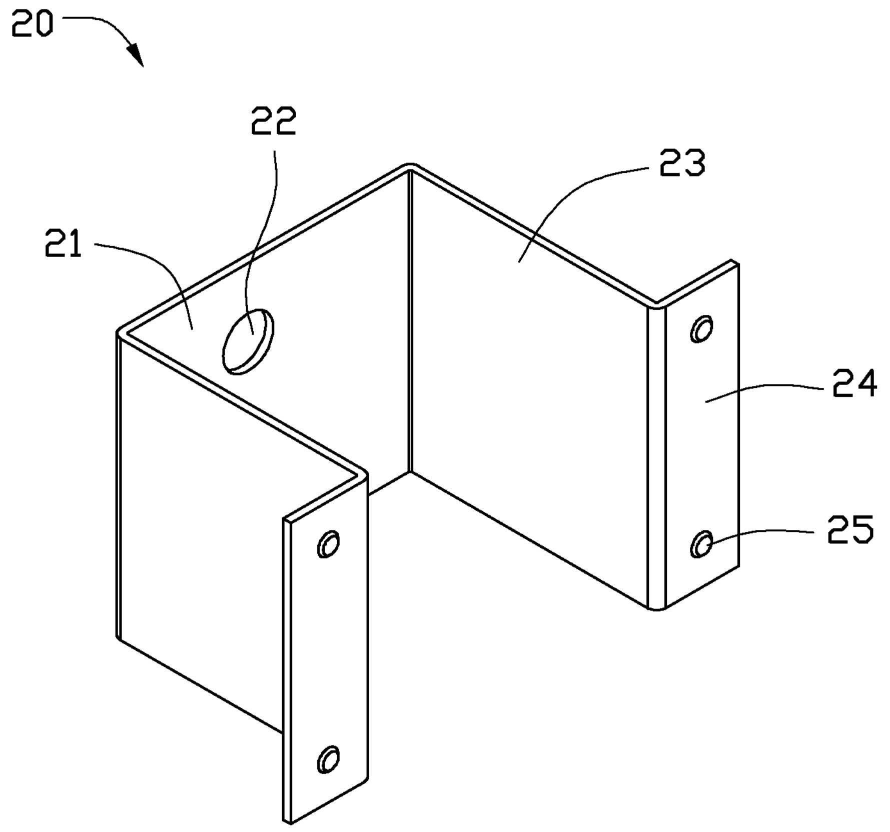
FIG. 2 is an isometric view of the fixing bracket of FIG. 1.
Figure 3:
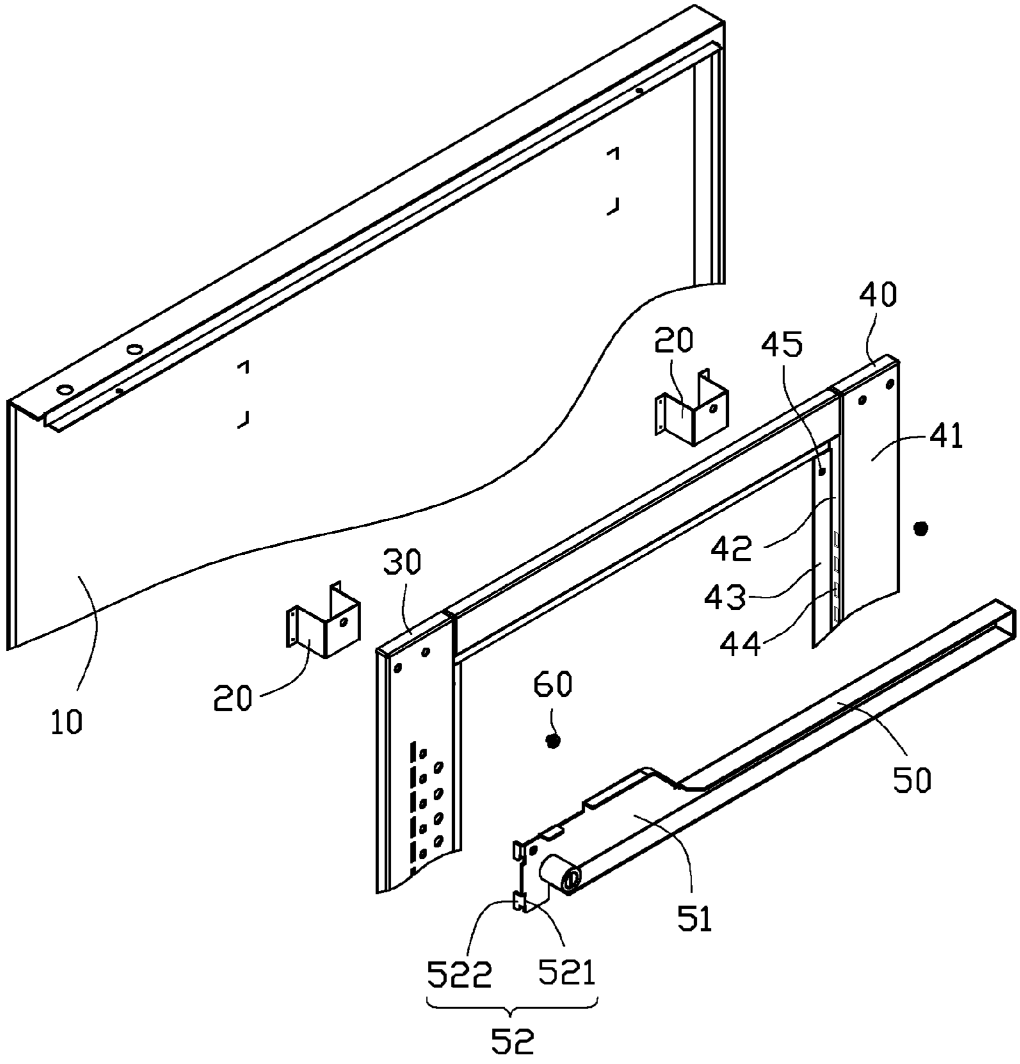
FIG. 3 is an isometric, exploded view of the side plate, the fixing bracket, the first mounting bracket, the second mounting bracket, and the slide of FIG. 1, viewed from one aspect.
Figure 4:
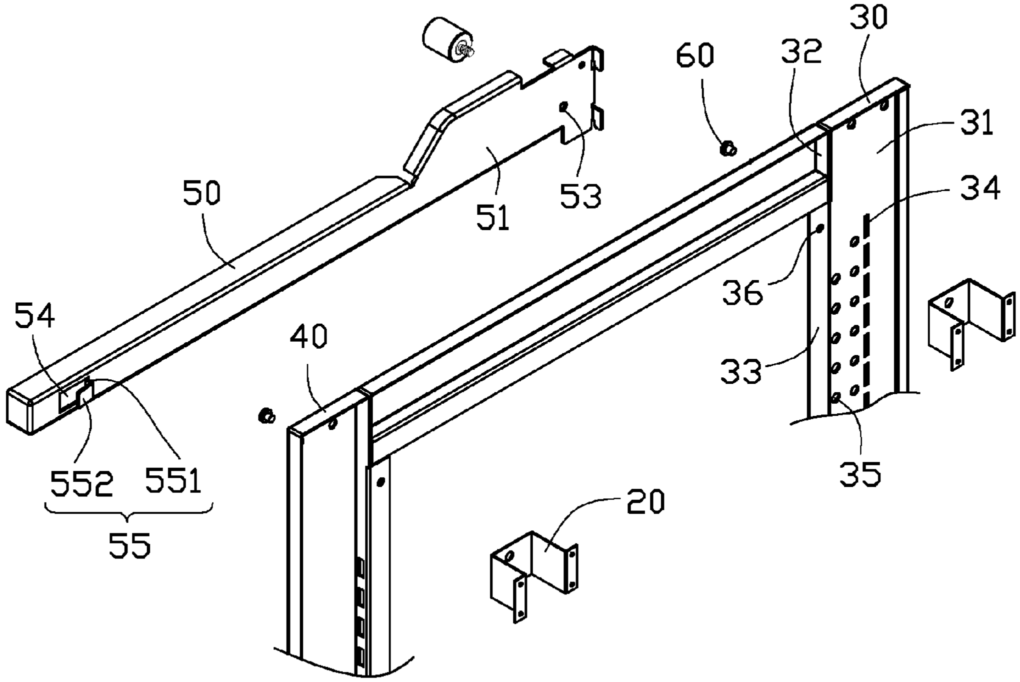
FIG. 4 is an isometric, exploded view of the side plate, the fixing bracket, the first mounting bracket, the second mounting bracket, and the slide of FIG. 1, viewed from another aspect.
Figure 5:
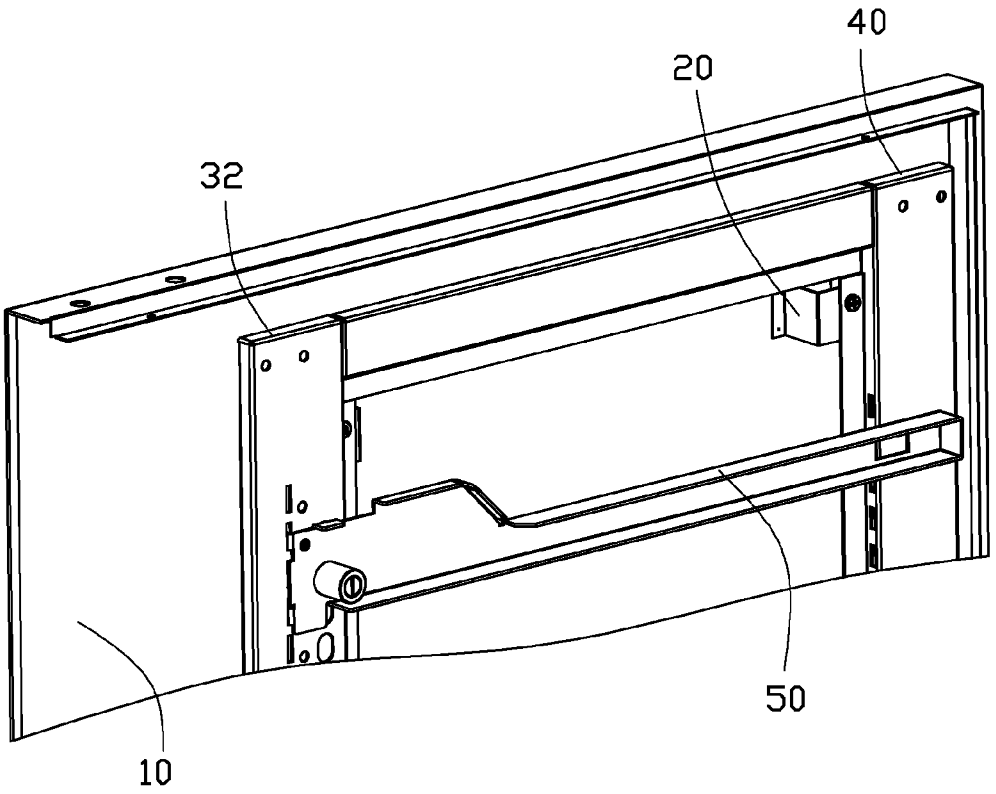
FIG. 5 is an assembled view of the bracket supporting apparatus of FIG. 3.

FIGS. 2 to 4 show each of the plurality of fixing brackets 20 includes a connection portion 21. Each connection portion 21 includes a round fixing hole 22. Two supporting portions 23 substantially perpendicularly extend from two side edges of each connection portion 21. A mounting portion 24 substantially perpendicularly extends from a side edge of each of the two supporting portions 23. Two arc-shaped protrusion portions 25 protrude from each mounting portion 24. In one embodiment, the fixing hole 22 is defined in each connection portion 21 adjacent to a top edge of the connection portion 21. The two supporting portions 23 are substantially parallel to the first mounting bracket 30 and the second mounting bracket 40. The two supporting portions 23 are substantially perpendicular to the plurality of slides 50.

The first mounting bracket 30 includes a first locating board 31. A first connection bracket 32 extends substantially perpendicularly from one side of the first locating board 31. A first securing bracket 33 extends substantially perpendicularly from a side edge of the first connection bracket 32. A plurality of first locating slots 34 and round locating holes 35 are defined in the first locating board 31. A plurality of round first through holes 36 are defined in the first securing bracket 33.

The second mounting bracket 40 includes a second locating board 41. A second connection bracket 42 substantially perpendicularly extends from one side of the second locating board 41. A second securing bracket 43 substantially perpendicularly extends from a side edge of the second connection bracket 42. A plurality of second locating slots 44 are defined in the second connection bracket 42. A plurality of round second through holes 45 are defined in the second securing bracket 43.

Each of the slides 50 includes a sliding portion 51. Two first hooks 52 and a third through hole 53 are located on one side of each sliding portion 51. Each two first hooks 52 includes a first supporting bracket 521 extending substantially perpendicularly from one side of the sliding portion 51, and a first locking bracket 522 extending downwards from a side edge of the first supporting bracket 521. An opening 54 is defined in another side of each sliding portion 51. A second hook 55 is located in the opening 54. The second hook 55 includes a second supporting bracket 551 extending substantially perpendicularly from a side edge of the opening 54, and a second locking bracket 552 extending substantially perpendicularly from a side edge of the second supporting bracket 551. In one embodiment, a length of the first supporting bracket 521 is less than a length of the first locking bracket 522. A length of the first locking bracket 522 is substantially equal to a length of the first locating slot 34. A length of the second supporting bracket 551 is substantially equal to a length of the second locating slot 44.

FIGS. 1 to 5 show that in assembly, the protrusion portions 25 of each mounting portion 24 are soldered on the side plate 10 to fix the plurality of fixing brackets 20 on the side plate 10. The first mounting bracket 30 and the second mounting bracket 40 are moved toward the side plate 10. The first through holes 36 of the first mounting bracket 30 are aligned with the fixing holes 22 of the corresponding fixing bracket 20. The second through holes 45 of the second mounting bracket 40 are aligned with the fixing holes 22 of the corresponding fixing bracket 20. A plurality of first fasteners 60 pass through the corresponding first through holes 36, the second through holes 45, and the fixing holes 22 to fix the first mounting bracket 30 and the second mounting bracket 40 on the corresponding fixing brackets 20.

The slides 50 are moved toward the first mounting bracket 30 and the second mounting bracket 40. The first locking brackets 522 of each slide 50 pass through the corresponding first locating slots 34 of the first mounting bracket 30. The second locking brackets 552 of each slide 50 pass through the corresponding second locating slots 44 of the second mounting bracket 40. The first supporting brackets 521 resist against bottom edges of the corresponding first locating slots 34. The second locking brackets 552 resist against bottom edges of the corresponding second locating slots 44. A plurality of second fasteners 70 pass through the third through holes 53 and the locating holes 35 to fix the plurality of slides 50 on the first mounting bracket 30 and the second mounting bracket 40. In one embodiment, a diameter of the fixing hole 22 is substantially equal to a diameter of the first through hole 36, a diameter of the second through hole, and a diameter of the first fastener 60. A diameter of the third through holes 53 is substantially equal to a diameter of the locating hole and a diameter of the second fastener 70.

Using a software application called ABAQUS to simulate a stress on each of the plurality of fixing brackets 20 when a product channel on the slide 50 is filled with goods. The simulation shows that the maximum stress on the fixing bracket 20 is about $2.226\times10^{2}$ Mega-Pascal (MPa) when using the bracket supporting apparatus of the disclosure, and is about $3.130\times10^{2}$ MPa when using a common bracket supporting apparatus. The maximum offset of the fixing bracket 20 is about $4.902\times10^{-2}$ millimeter (mm) when using the bracket supporting apparatus of the disclosure, and is about $4.538\times10^{-2}$ mm when using a common bracket supporting apparatus. The maximum stress and the maximum offset of the fixing bracket 20 are decreased, which avoids the side plate 10 distorting when the product channel on the slide 50 is filled with goods.

Even though numerous characteristics and advantages of the present disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. A bracket supporting apparatus, comprising:

a side plate;

two fixing brackets fixed to the side plate; each of the two fixing brackets comprises a connection portion defining a fixing hole; two supporting portions extend from two sides of the connection portion; a mounting portion extends from one side of each of the two supporting portions;

a first mounting bracket defining a first through hole; and a second mounting bracket defining a second through hole; wherein the two supporting portions of each of the two fixing brackets are substantially parallel to the first mounting bracket and the second mounting bracket; the mounting portions are fixed to the side plate; and a first fastener passes through each of the first through holes, the second through holes, and the fixing holes to fix the first mounting bracket and the second mounting bracket to each of the two fixing brackets.

2. The bracket supporting apparatus of claim 1, wherein the fixing hole is defined in a top edge of the connection portion.

3. The bracket supporting apparatus of claim 1, wherein a diameter of the fixing hole is substantially equal to a diameter of the first through hole, a diameter of the second through hole, and a diameter of the first fastener.

4. The bracket supporting apparatus of claim 1, wherein a slide is mounted on the first mounting bracket and the second mounting bracket; the first mounting bracket and the second mounting bracket are substantially perpendicular to the slide on the side plate; and the two supporting portions of each of the two fixing brackets are substantially perpendicular to the slide.

5. The bracket supporting apparatus of claim 4, wherein the first mounting bracket comprises a first locating board; a first connection bracket extends from one side of the first locating board; a first securing bracket extends from a side edge of the first connection bracket; and the first through hole is defined in the first securing bracket.

6. The bracket supporting apparatus of claim 5, wherein the second mounting bracket comprises a second locating board; a second connection bracket extends from one side of the second locating board; a second securing bracket extends from a side edge of the second connection bracket; and the second through hole is defined in the second securing bracket.

7. The bracket supporting apparatus of claim 6, wherein a first locating slot and a locating hole are defined in the first locating board; a second locating slot is defined in the second connection bracket; the slide comprises a sliding portion; a first hook and a third through hole are located on one side of the sliding portion; a second hook is located on another side of the sliding portion; the first hook is received in the first locating slot; the second hook is received in the second locating slot; and a second fastener passes through the third through hole and the locating hole to fix the slide on the first mounting bracket and the second mounting bracket.

8. The bracket supporting apparatus of claim 7, wherein the first hook comprises a first supporting bracket extending from one side of the sliding portion, and a first locking bracket extending downwards from a side edge of the first supporting bracket; an opening is defined in another side of the sliding portion; the second hook comprises a second supporting bracket extending from a side edge of the opening, and a second locking bracket extending from a side edge of the second supporting bracket; the first supporting bracket resists against a bottom edge of the first locating slot; and the second locking bracket resists against a bottom edge of the second locating slot.

9. The bracket supporting apparatus of claim 8, wherein a length of the first supporting bracket is less than a length of the first locking bracket; a length of the first locking bracket is substantially equal to a length of the first locating slot; and a length of the second supporting bracket is substantially equal to a length of the second locating slot.

10. The bracket supporting apparatus of claim 1, wherein two protrusion portions protrudes from each of the mounting portions; and the protrusion portions of each of the mounting portions are soldered on the side plate.

11. A bracket supporting apparatus, comprising:

a side plate;

two fixing brackets each fixed to the side plate; each of the two fixing brackets comprises a connection portion defining a fixing hole; the fixing hole being adjacent to a top edge of the connection portion; two supporting portions extend from two sides of the connection portion; a mounting portion extends from one side of each of the two supporting portions;

a first mounting bracket defining a first through hole; and a second mounting bracket defining a second through hole; wherein the two supporting portions of each of the two fixing brackets are substantially parallel to the first mounting bracket and the second mounting bracket; the mounting portions are fixed to the side plate; and a first fastener passes through each of the first through holes the second through holes, and the fixing holes to fix the first mounting bracket and the second mounting bracket on each of the two fixing brackets.

12. The bracket supporting apparatus of claim 11, wherein a diameter of the fixing hole is substantially equal to a diameter of the first through hole, a diameter of the second through hole, and a diameter of the first fastener.

13. The bracket supporting apparatus of claim 11, wherein a slide is mounted on the first mounting bracket and the second mounting bracket; the first mounting bracket and the second mounting bracket are substantially perpendicular to the slide on the side plate; and the two supporting portions of each of the two fixing brackets are substantially perpendicular to the slide.

14. The bracket supporting apparatus of claim 13, wherein the first mounting bracket comprises a first locating board; a first connection bracket extends from one side of the first locating board; a first securing bracket extends from a side edge of the first connection bracket; and the first through hole is defined in the first securing bracket.

15. The bracket supporting apparatus of claim 14, wherein the second mounting bracket comprises a second locating board; a second connection bracket extends from one side of the second locating board; a second securing bracket extends from a side edge of the second connection bracket; and the second through hole is defined in the second securing bracket.

16. The bracket supporting apparatus of claim 15, wherein a first locating slot and a locating hole are defined in the first locating board; a second locating slot is defined in the second connection bracket; the slide comprises a sliding portion; a first hook and a third through hole are located on one side of the sliding portion; a second hook is located on another side of the sliding portion; the first hook is received in the first locating slot; the second hook is received in the second locating slot; and a second fastener passes through the third through hole and the locating hole to fix the slide on the first mounting bracket and the second mounting bracket.

17. The bracket supporting apparatus of claim 16, wherein the first hook comprises a first supporting bracket extending from one side of the sliding portion, and a first locking bracket extending downwards from a side edge of the first supporting bracket; an opening is defined in another side of the sliding portion; the second hook comprises a second supporting bracket extending from a side edge of the opening, and a second locking bracket extending from a side edge of the second supporting bracket; the first supporting bracket resists against a bottom edge of the first locating slot; and the second locking bracket resists against a bottom edge of the second locating slot.

18. The bracket supporting apparatus of claim 17, wherein a length of the first supporting bracket is less than a length of the first locking bracket; a length of the first locking bracket is substantially equal to a length of the first locating slot; and a length of the second supporting bracket is substantially equal to a length of the second locating slot.

19. The bracket supporting apparatus of claim 11, wherein two protrusion portions protrudes from each of the mounting portions; and the protrusion portions of each of the mounting portions are soldered on the side plate.

* * * * *